No. 669,600. Patented Mar. 12, 1901.
C. W. & G. C. SKINNER.
SEED PLANTER.
(Application filed Jan. 4, 1900.)
(No Model.) 2 Sheets—Sheet 1.

WITNESSES:
Walter E. Haar
J. Donald Boyer

INVENTORS:
Chas. W. Skinner
and Geo. C. Skinner,
BY
Frank M. Burnham
ATTORNEY.

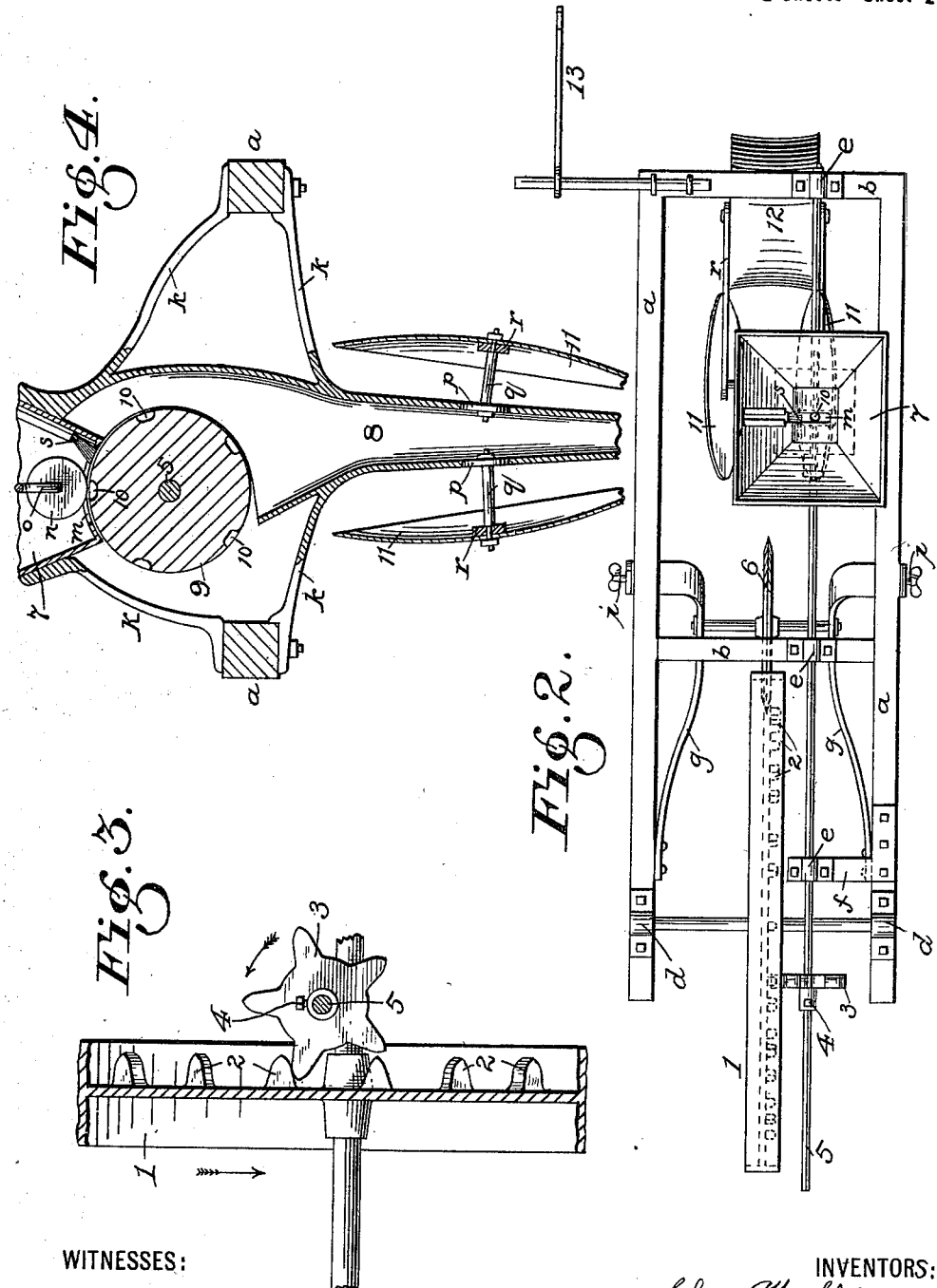

UNITED STATES PATENT OFFICE.

CHARLES W. SKINNER AND GEORGE C. SKINNER, OF TROY, OHIO.

SEED-PLANTER.

SPECIFICATION forming part of Letters Patent No. 669,600, dated March 12, 1901.

Application filed January 4, 1900. Serial No. 341. (No model.)

*To all whom it may concern:*

Be it known that we, CHARLES W. SKINNER and GEORGE C. SKINNER, citizens of the United States, residing at Troy, in the county of Miami and State of Ohio, have invented certain new and useful Improvements in Seed-Planters; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in seed-planters designed for sowing or dropping seed in the earth or soil in hills or drills; and it has for its objects and advantages the producing of a planter simple in construction, of few parts, and one which may be quickly and easily operated and manufactured at a minimum cost; and it consists in providing means for carrying seeds of various kinds and all sizes—such as corn, beans, peas, onions, turnips, &c.—and means for dropping or sowing said seed at various distances apart, as desired; and to this end it consists in the combination and subcombinations of novel features of construction and arrangement of the various parts, as will be more fully described hereinafter, and pointed out in the subjoined claims in accordance with the statutes in such cases made and provided therefor.

Figure 5:
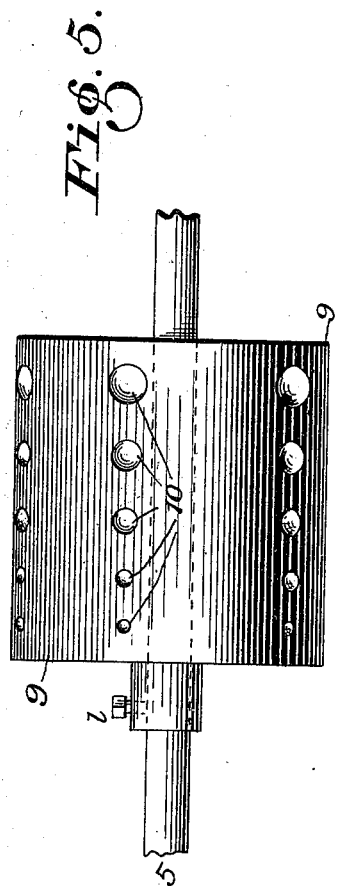
Figure 1:
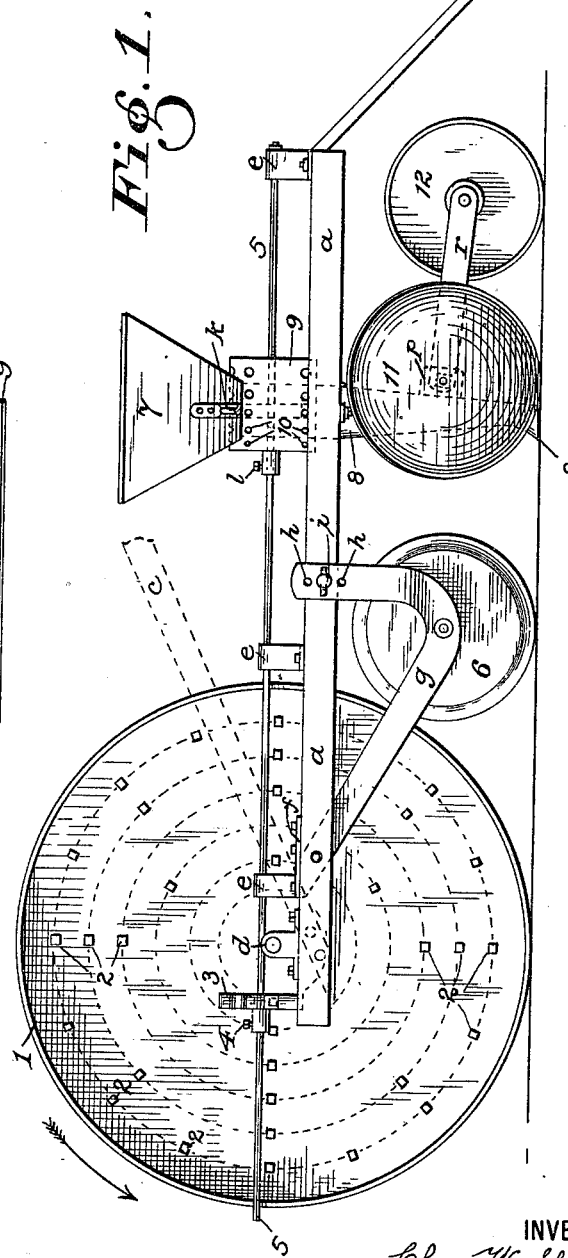

Referring to the accompanying drawings, illustrating our invention, and in which similar letters and numerals of reference indicate like parts throughout the several views, Figure 1 is a side elevation of our improved seed-planter, and Fig. 2 is a plan view of the same. Fig. 3 is a detail view, on an enlarged scale, of a portion of the drive-wheel as broken and cut away, so as to show an outside row of the cogs or teeth on said drive-wheel in mesh with teeth on sprocket or star wheel which revolves the seed-drum. Fig. 4 is an enlarged detail view, partially in vertical section, of seed hopper, drum, spout, and the concaved disk-wheels and showing inside the hopper the small wheel or idler for pressing and the brush for distributing the seed into the pockets of the seed-drum; and Fig. 5 is an enlarged detail view of the seed drum or cylinder, showing the pockets or cavities therein which carry and feed the seed to the spout.

In describing our invention in detail and having reference to the different parts by means of the aforesaid letters and numerals of reference as employed in the several views of the accompanying drawings, $a$ indicates the rails or side portions of the frame of our improved planter, which are strongly and firmly connected by braces or cross-pieces $b$, said frame being provided with suitable handles $c$, one on each side, for the use of the operator, shown by dotted lines as broken off in Fig. 1. Mounted on said side rails near their front or forward ends are bearings $d$, in which are journaled the ends of, and revolubly support the shaft of, drive or master wheel 1, said drive-wheel being preferably formed with a rim or tire having a broad tread and provided on one of its side faces with a number of teeth or cogs 2, arranged or disposed in circular form, as shown in dotted lines in Fig. 1 for the purpose of illustration, and as the planter moves forward said drive-wheel revolves in the direction shown by the arrow. Cogs 2 may consist of from one or more and increasing to any given number in each circle or row and extending at any given radius from center or shaft of drive-wheel and at any desired distance apart in the circle one from the other, so as to properly engage or mesh with the teeth of small sprocket or star wheel 3, thus revolving said sprocket and feed wheel and causing the seed to be dropped or sown in the earth at the desired distance apart by reason of sprocket-wheel 3 having its hub provided with a set-screw 4, by which it can be adjusted or moved on longitudinal shaft 5, passing through a central opening or bore in said sprocket, so that its teeth may engage the cogs in any circle on said drive-wheel as desired.

Longitudinal shaft 5 extends horizontally the entire length of the planter from the rear of the frame, where it is suitably journaled and held in the rear bearing by a nut, to a short distance in front of the drive-wheel and is supported and revolves or turns in bearings e, mounted or attached to the braces b and an arm f, said arm extending from one of the side rails.

6 is a bevel-edged furrowing-wheel, which has its shaft revolubly supported in two suitably-curved side arms g, said side arms each being pivotally hung at one end to one of the side rails of the frame, the other end being provided with openings h to receive a set-screw and nut i, so as to adjustably and vertically connect them with the side rails by which they are supported, thus permitting of the raising and lowering of furrow-wheel 6, so its beveled edge will cut the furrow in the soil to the proper depth for the reception of the seed as sown. Said beveled edge may be preferably formed very wide and deep, if desired, thus cutting a wide deep furrow free and clear from weeds or trash.

A hopper 7, having connected to it a spout 8, as more fully shown in detail in Fig. 4, is supported by arms or brace-rods k, connected by bolts or otherwise to the side rails of the frame, said spout being formed on one side at its mouth or top sufficiently concaved as to an arc of a circle to fit closely to a seed drum or cylinder 9, formed with an equal number of rows of pockets or cavities 10 for the reception of seed as there are teeth on sprocket 3, the pockets of each row varying in size from the smallest to the largest sized seed it is desired to sow. Seed-drum 9 is further provided with a central bore or opening, through which passes said longitudinal shaft 5, which supports it, and also with a hub and set-screw l, by which it can be adjusted or moved on the longitudinal shaft, so that the row having the desired-sized pockets corresponding to the sized seed to be sown will register directly under slot m in bottom of hopper 7, and as the planter moves forward the drive-wheel is caused to revolve in the direction indicated by the arrow, and its cogs or teeth engaging the teeth on the sprocket-wheel will revolve said sprocket, which will in turn revolve the longitudinal shaft carrying the seed-drum, and the seed to be sown having first been placed in the hopper descending through the slotted opening in bottom of hopper will enter the pockets in the row in said seed-drum as it registers with said slot and be forced into said pockets by the revolving of the drum coming in contact with and revolving a small wheel or idler n on its shaft o, on which it is loosely mounted, said shaft being suitably formed and connected to the sides of the hopper. Attached to one side of the hopper in any suitable manner so as to be vertically adjustable, as desired, is placed a small brush s, which levels off the superfluous amount of seed as said seed-drum revolves over and deposits its seed in the mouth of the spout, which drop or descend by gravity through said spout and are sown in the furrow in the earth or soil cut by the beveled edge of furrow-wheel.

Spout 8 is formed about midway its height with two extensions or flanges p, (being sufficiently shown by dotted lines in Fig. 1 and solid lines in Fig. 4,) to each of which is suitably connected by a nut or otherwise a shaft q, similar in form to a large bolt. The other end of each of these shafts being suitably formed and provided with a nut or otherwise at its end, so that said shafts will each revolubly support in a slightly-inclined position one of the two concaved disk-wheels 11, their concaved sides or faces coming one on each side of the furrow in which the seed has been sown, as just described, will cover up said seed in said furrow as the planter continues to move forward.

Loosely and pivotally mounted one upon each of the shafts q are the movable or oscillating arms r, the opposite ends of which support a shaft properly journaled therein, on which is a pressure-wheel 12, provided with a rim or tire having a broad tread slightly concaved. Said pressure-wheel following in line with the space between, in the rear of, and directly and closely after said disk-wheels and being of sufficient weight will press the earth or soil over the furrow which has been thrown up by the disk-wheels and by reason of its shaft being journaled in the vertically-movable arms r will adapt itself to any irregularities of the ground.

Conveniently and suitably connected to our planter we provide a marker 13, of any preferred or well-known form, for the purpose of marking the line for the planter to follow in sowing the seed in the next row on the return trip.

It will be obvious from the accompanying drawings and foregoing description that we have invented a planter susceptible of being constructed to carry any and all sized seed and to sow said seed in hills at a distance, say, from about two inches to four feet or practically any distance apart desired; also, that the features of construction and arrangement of the several parts may be somewhat varied or modified without departing from the spirit and principles of our invention—as, for instance, the seed-hopper may or may not be provided with a cover or lid at its top, as shown, respectively, in Figs. 1 and 2; also, that said drive or master wheel may be provided with similarly arranged or disposed cogs or teeth on both sides or faces, so that in case any of the cogs should be broken off the drive-wheel may be reversed, or the star or sprocket wheel may be arranged to work on the side of shaft nearest to the rear of equally as well as the side of shaft nearest to front of planter.

Having now described our invention, what we claim as new, and desire to secure by Letters Patent, is—

1. In a seeder for planting or sowing seed; a drive or master wheel formed with teeth arranged at irregular distances apart as to each row, so as to cause the seed to be sown at different and desired distances apart; a sprocket or star wheel, the teeth of which are adapted to be engaged by the teeth of said drive-wheel; a longitudinal shaft on which is adjustably mounted means for carrying seed of different sizes; a furrow-wheel; a hopper for carrying and distributing the seed; means for covering the soil over the seed as sown; and a pressure-wheel for compactly pressing the furrow; all in combination substantially as described.

2. The combination in a seed-planter; of the master-wheel 1, provided with the cogs or teeth 2 disposed at irregular distances apart as to each row or series, so as to sow the seed at different and desired distances apart; sprocket-wheel 3 operated by said master-wheel; longitudinal shaft 5; on which is adjustably mounted seed-drum 9, provided with receptacles of varying capacity adapted to distribute different-sized seed; wheel 6 adapted to cut a furrow; the hopper for receiving and conveying the seed to be sown to the drum; means to cover the soil over the seed as sown; and a pressure-wheel for pressing the furrow; substantially as herein described.

3. In a seed-planting device; a master-wheel formed with teeth arranged at irregular distances apart and in such a manner as to cause the seed to be sown at different and desired distances apart; a star-wheel operated by said master-wheel; a shaft on which is adjustably mounted a seed-drum formed with different-sized receptacles for receiving seed of various sizes and kinds; a furrow-wheel; a hopper for carrying the supply of seed, and provided with means for pressing and distributing the seed through an opening in said hopper; a spout to said hopper for conveying the seed to the earth or soil; means provided for covering the earth over the seeds as sown; and a pressure-wheel for pressing the furrow; all in combination one with the other, substantially as described.

4. In a seed-planter the combination; of the drive-wheel 1, provided with the teeth 2 disposed at irregular distances apart; sprocket-wheel 3; shaft 5; seed-drum 9 formed with pockets or receptacles 10 of different sizes, said drum being adjustably mounted upon said shaft; furrow-wheel 6; hopper 7 provided with small wheel $n$ and brush $s$ for pressing and distributing the seed through opening $m$ in said hopper; spout 8 for conveying the seed to the earth or soil; disk-wheels for covering the earth over the seeds as sown; pressure-wheel 12 for leveling or pressing the furrow; and the marker for outlining the next row; all substantially as herein described.

In testimony whereof we have affixed our signatures in presence of two witnesses.

CHAS. W. SKINNER.
GEORGE C. SKINNER.

Witnesses:
  C. N. BURNS,
  W. H. WHEATON.